No. 635,853. Patented Oct. 31, 1899.
E. C. HENN.
METAL WORKING MACHINE.
(Application filed Dec. 23, 1898.)
(No Model.) 2 Sheets—Sheet 1.
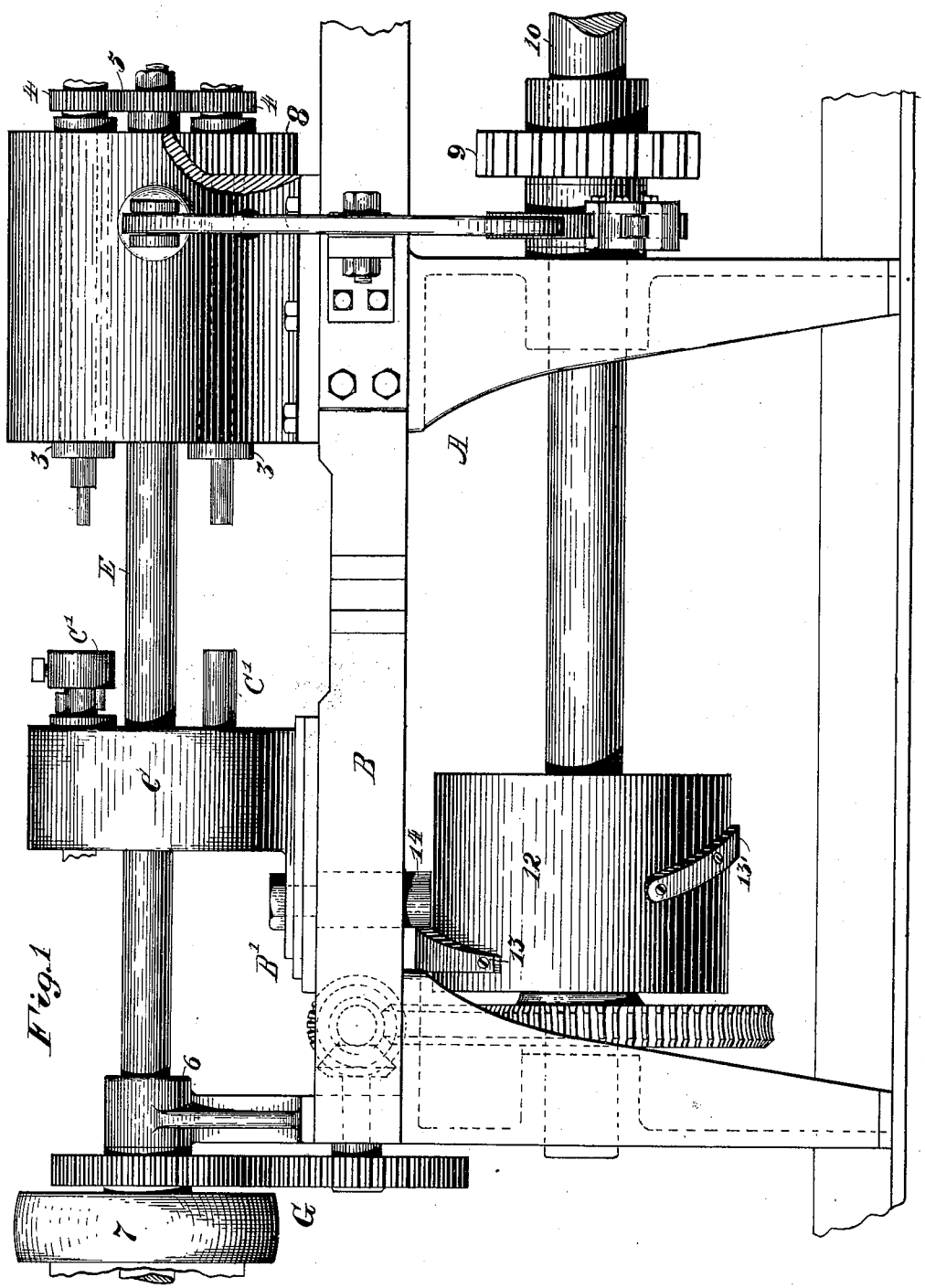

No. 635,853. Patented Oct. 31, 1899.
E. C. HENN.
METAL WORKING MACHINE.
(Application filed Dec. 23, 1898.)
(No Model.) 2 Sheets—Sheet 2.
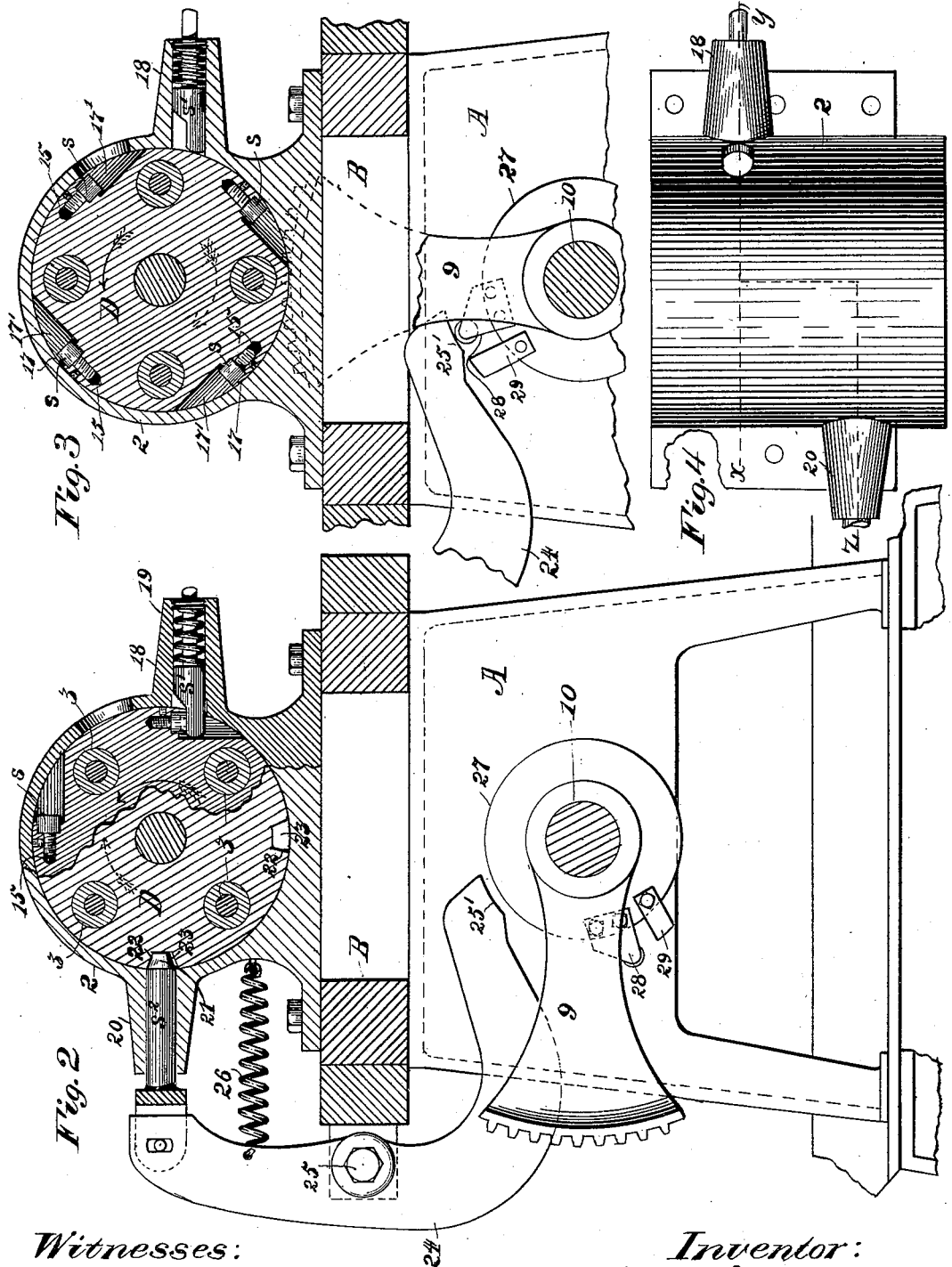
Witnesses:
William H. Barker.
James A. Ogilvy
Inventor:
Edwin C. Henn,
by his Attorneys,
Whitney & Rothwell.

UNITED STATES PATENT OFFICE.

EDWIN C. HENN, OF BLOOMFIELD, CONNECTICUT.

METAL-WORKING MACHINE.

SPECIFICATION forming part of Letters Patent No. 635,853, dated October 31, 1899.

Application filed December 23, 1898. Serial No. 700,113. (No model.)

*To all whom it may concern:*

Be it known that I, EDWIN C. HENN, a citizen of the United States of America, and a resident of Bloomfield, in the county of Hartford and State of Connecticut, have invented certain new and useful Improvements in Metal-Working Machines, of which the following is a specification.

This invention relates generically to a metal-working machine, and more specifically to a machine embodying a multispindle or multichuck turret—that is, a machine embodying a rotary carrier having a plurality of work-holding spindles or tool-carrying chucks—as, for instance, a machine of the "screw-making" or "turret-lathe" class. With machines of this class as heretofore constructed considerable difficulty has been experienced and much work has been ruined or imperfectly done by the frequent misalinements or disarrangements of the tools with respect to the work or the work with respect to the tools, and no machine to my knowledge has been heretofore devised embodying any practical means for obviating this difficulty or correcting this vital imperfection.

The primary object of this invention, briefly stated, is to produce a metal-working machine having a multispindle turret and means, substantially as hereinafter described, in connection with said turret and independent of the turret-rotating means, for automatically adjusting the spindles successively to bring each into positive alinement or into accurate position with respect to a predetermined fixed point, thereby correcting any misalinement or disarrangement of each spindle immediately following each step-by-step rotative movement of the turret.

A further object of the invention is to provide, in connection with the turret of a metal-working machine, two independently and automatically operative turret-actuating devices, operative for imparting rotative movements of relatively-varying ranges to said turret, whereby the tools or work-holders of said turret may first be advanced to an approximate predetermined position with relation to a fixed point on the machine and then automatically adjusted to and accurately centered with respect to said point, and, further, to provide means whereby the respective movements of the two turret-actuating devices may be accurately timed with relation to each other and whereby the effective duration of movement of one may be increased or decreased, as required.

In the drawings accompanying and forming part of this specification, Figure 1 is a side elevation of a portion of one form of metal-working machine embodying my present invention, the parts thereof being in positions corresponding to the positions of like parts shown in Fig. 2. Fig. 2 is an end view, partly in section, of said machine as seen from the right in Fig. 1, the section being taken on a line corresponding with the dotted angular line $y\ z$ in Fig. 4, the turret being shown locked, with its spindles in normal operative positions, and the turret-rotating sector or fan-wheel being shown out of engagement with the spur-gear of said turret. Fig. 3 is an end view, partly in section, of a portion of the machine, the section being taken on a line corresponding with the straight dotted line $x\ y$ in Fig. 4 and showing the parts in positions differing from those shown in Fig. 2, portions of the turret-rotating sector being shown in full and dotted lines; and Fig. 4 is a plan view of a portion of the turret and its casing or bearing detached.

For convenience my present invention is shown in the accompanying drawings, embodied in a screw-making machine such as shown and described in Letters Patent of the United States, No. 530,180, granted to me December 4, 1894, to which reference may be had.

In the drawings only so much of a metal-working machine is shown as will clearly illustrate the construction, organization, and mode of operation of my present improvements.

My improved machine, in the form thereof shown in the accompanying drawings, embodies the following elements, viz: a non-rotating reciprocatory tool-carrier adapted for carrying a plurality of tools, mechanism for automatically moving said tool-carrier toward and from and for limiting the movement thereof with relation to the work, a work-spindle carrier or turret having a series of remotely-disposed spindle-receiving sockets formed therein, a series of work-holding spindles or chucks rotatively supported in said sockets, automatically-operative mechanism for imparting intermittent rotative movements of corresponding ranges to the turret, whereby to bring the spindles into approximately correct position successively with respect to a tool or fixed point on the machine, independently-operative turret adjusting and locking means effective alternately with the turret-rotating means for shifting the turret rotatively predetermined distances intermediate to intermittent rotations of said turret, whereby to bring the turret-spindles successively and automatically into accurate alinement or centered position with respect to said tool or fixed point, and means whereby the duration of time in movement of the turret-adjusting mechanism may be regulated with relation to that of the turret-rotating mechanism.

The framework of the machine, which is designated in a general way by A, may be of any suitable construction for carrying the several operative parts, and, in the form thereof shown in the accompanying drawings, consists of a bed B, composed of suitable side rails and end rails supported on legs in any usual or suitable manner, said legs resting on an oil-pan, as in machines of this class.

Supported on the bed B in the usual manner is a sliding tool-carrier B', having the tool-carrying head C at or near the forward end thereof, which tool-carrier preferably has a series of metal-working tools, as C', usually four in number, equidistantly arranged about a common center.

The work-spindle carrier or turret D, which will in some instances be herein referred to as a "spindle-carrier," "work-carrier," "spindle-turret," or "chuck-carrier," is shown rotatively supported in a horizontal bearing in a turret-casing 2, shown flanged at its base and bolted to the bed B of the machine near the forward end thereof. Formed around and in parallelism with the axis of said turret is a series of sockets or bearings, in each of which is journaled a tubular chuck-sleeve or work-carrying spindle 3, which may be of the same general construction and organization as the chuck-sleeve or work-spindle described in the patent hereinbefore referred to, each spindle being adapted for carrying a rod or piece of work to be operated upon by the tools of the tool-holder, and, when my improvements are employed in a screw-making machine, means (not shown) will be provided for opening, closing, and advancing the chucks or spindles, which means may be substantially such as shown and described in the patent hereinbefore referred to.

In the drawings the turret is shown having four spindle-carrying sockets disposed equidistantly about a common center, and each socket has a spindle rotatively supported therein. These spindles, which are, substantially, duplicates of one another, are each provided with a pinion 4, affixed thereto, and are simultaneously rotated by a gear-wheel 5, secured to the forward end of a driving-shaft E, which shaft is journaled at its forward end in the turret and at its rear end in a bearing 6, secured to or forming a part of the bed of the machine, said shaft extending through the tool-carrier, as shown in the drawings, and being provided at its rear end with the usual driving-pulley 7.

The spindle-carrier or turret D may be constructed to carry any desired number of work-spindles, and the tool-carrier may be likewise constructed to carry a corresponding or any desired number of tools, the number of spindles and tools depending, of course, on the number of separate operations to be required to complete the piece of work. In the present instance the turret is shown carrying four equidistant work-spindles simultaneously rotated by the gear-wheel 5, meshing with the circumferentially-disposed pinions 4, one fixed to each spindle.

Through mechanism hereinafter described the work-spindles not only have a rotative movement about their own axes, but also have an intermittent orbital movement about a common axis. This intermittent orbital movement is imparted to the work-spindles for the purpose of bringing the rod carried by said spindles successively into position to be operated upon by the successive tools of the tool-carrier C.

As a means for imparting intermittent or step-by-step rotative movements of predetermined arc distances, each equal to an aliquot division of the circumference of the turret, to thus secure intermittent orbital movements of the spindles, the turret is shown having a spur-gear 8 at the outer end thereof, which is intermittently engaged by a toothed sector or fan-wheel 9, fixed to a driven shaft 10, journaled in suitable bearings in the framework of the machine, below and in parallelism with the main driving-shaft E of the machine. This sector or segment-gear 9 is so constructed and disposed as to impart to the turret D at each complete rotation of the driven shaft 10 a rotative movement of a range equal to the arc distance between two adjacent spindles—that is, if the turret is provided with four spindles a quarter-turn is imparted to the turret at each complete rotation of the shaft 10, leaving the turret stationary the proper length of time to allow the tools to complete their operations on the work carried on the spindles.

The main driving-shaft E and driven shaft 10 are simultaneously rotated at different speeds through the medium of a train of speed-reducing gears G, connecting with shafts, and the shaft 10 is shown having a cam-wheel or cylinder 12 fixed thereto, on which is mounted tool-carriage-actuating cam-strips 13 13', which are shown in position to engage a stud 14, fixed to the tool-carriage and whereby the tool-carriage will be reciprocated in proper timing with the rotative movements of the turret in any usual manner.

The mechanism for intermittently rotating the turret, the mechanism for rotating the spindles, and the means for reciprocating the tool-carriage may be variously modified within the purview of this invention.

Further, the machine may simply embody a non-reciprocating tool-carrying turret and have intermittent rotative movements imparted to it by hand after the manner of turrets in ordinary turret-lathes. Therefore the term "turret" as employed in certain of the claims herein signifies generically any species of turret adapted to either carry tools or work-spindles, whether rotated by hand or by automatically-operating mechanism.

All of the elements described in the preceding portion of this specification, with the exception of the turret D, may be of substantially the same specific construction and organization as like elements described in the aforesaid patent, and for a more complete description of the operation of these elements reference may be had to that patent.

In machines of this class as heretofore constructed, and particularly in the manner described in the patent referred to, means, as hereinbefore described, were provided for imparting to the turret rotative movements equal to aliquot divisions of the length of its circumference and for locking the turret in the position it was left by the turret-rotating means; but no means were provided for shifting the turret intermediate to successive rotative movements thereof to change the positions of the spindles after the turret-rotating means had completed its operation.

With machines as heretofore constructed it frequently happens that the spindle or spindles when the turret-rotating means has completed its operation are not in properly-centered position with respect to the tool or tools, this misalinement or disarrangement of the spindles resulting from various causes, as by one spindle wearing more than another, distortion of the carrier, due to atmospheric or similar influences, by the springing of the framework, &c. Therefore the absence of means for automatically adjusting the spindles successively to bring them into time-working position was a vital defect in machines as heretofore constructed and was the cause of much impaired or ruined work. To obviate this difficulty, I have provided what may be termed "spindle-positioning" means operative independent of the turret-rotating means for automatically shifting the turret rotatively after each intermittent rotative movement thereof to bring the spindles successively to accurate working or alined position with relation to a fixed point on the machine, this fixed point being usually a tool, and for locking the turret after the spindle is in a true adjusted position.

In the preferred form thereof (shown most clearly in Figs. 2 and 3 of the drawings) the spindle-positioning means for shifting the turret independent of its intermittent rotative movements to adjust the spindles to correct working position and compensate for any misalinement and for locking said turret in its adjusted position comprises two coöperative stop members $s$ and $s'$ and a turret shifting and locking member $s^2$. One of said stop members, as $s$, is shown in the nature of a screw adjustably seated in a screw-threaded bearing 15, formed in a transverse shouldered portion 17 of the turret, near the periphery thereof, said shouldered portion being formed by recessing the periphery of the turret, as at 17', as will be understood by reference to Figs. 2 and 3, the head of the stop member (which stop member will be for convenience termed a "stop-abutment") being extended beyond the face of the shouldered portion 17, more or less, the other stop member, as $s'$, being shown as a reciprocatory member, herein termed a "stop," supported in a horizontal bearing 18 on the turret-casing and projectable into the path of the stop-abutment $s$, means, as a spring 19, being provided for automatically effecting an advancing movement of the stop concurrently with the arrival of the stop-receiving recess 17' adjacent said stop, as will be readily understood.

In practice the number of stop-abutments $s$ will correspond to the number of spindles mounted in the turret, there being four stop-abutments shown in the present instance, one between each pair of spindles, and there being one stop, as $s'$, common to and successively coöperative with said stop-abutments, the stop-receiving recesses being preferably equidistantly disposed at one point in the length of the turret. The two stop members $s$ and $s'$ determine the working position of a spindle, the stop-abutment being adjusted in or out, as required, to compensate for any misalinement of said spindle.

The turret shifting and locking member, which constitutes an element of the spindle-positioning means, is shown in the nature of a bolt $s^2$, seated for reciprocatory movement in a bearing 20 on the casing, preferably opposite to the bearing 18, and having a wedge-shaped or beveled portion 21, coöperating with a corresponding bevel portion 22 of a lock-notch 23, formed in the periphery of the turret. This lock-notch is shown disposed centrally between two adjacent spindles, there being in the present instance a series of four lock-notches located about the turret at a point in the length of said turret different from that in which the stop-receiving recesses are located—that is to say, the stop-receiving recesses and the bolt-receiving recesses are circumferentially disposed about the turret at relatively different points in the length of said turret.

In the construction and organization thereof shown in the accompanying drawings the intermittently-operative turret-rotating mechanism imparts equidistant rotative movements to the turret in the direction of the full-line arrow in Figs. 2 and 3, whereas the independent shifting or adjusting and positioning means imparts a slight shifting movement to said turret in an opposing direction or in the direction of the dotted-line arrow in Figs. 2 and 3, the turret-rotating mechanism first operating to shift the turret and spindles to an approximately correct position and the turret-shifting bolt $s^2$ then operating to shift the turret automatically in an opposite direction to bring the stop-abutment $s$ into tight engagement with the stop $s'$, which determines the correct position of the spindle.

The stop-notches are shown of greater width in the direction of rotation of the turret than is the wedge portion of the turret shifting and locking bolt $s^2$ for obvious reasons.

As a means for actuating the turret-shifting bolt and for preventing an advancing movement of said bolt until the stop $s'$ is in an advanced position I have provided bolt-actuating means and timing means, which, in the preferred form thereof shown in the accompanying drawings, comprises a bolt-actuating lever 24, pivotally supported at 25 on the bed of the machine, the upper end thereof being shiftably connected with the outer end of the bolt and the lower end thereof being extended inward and terminating in a cam-faced portion 25', located above and slightly at one side of the driven shaft of the machine, a spring 26, fixed to the lever and a fixture on the machine in position and adapted for normally exerting a bolt-advancing stress on the lever, and a lever-actuator and retarder consisting in the form shown of a rotary carrier 27, fixed to the shaft 10, and two lever-actuating members 28 and 29, preferably adjustably secured to the carrier and extending beyond the periphery thereof in position for engaging the cam-faced portion 25' of and for imparting a bolt-retracting movement to the lever 24, the members 28 and 29 being adjustable circumferentially toward and from each other about the carrier for the purpose of increasing or decreasing the length of time the bolt is retained in a retracted position.

For the purpose of facilitating the adjustment of the two members 28 and 29 relatively to each other and about the periphery of the carrier 27 said members are, as shown in Fig. 1, bifurcated at their inner ends, straddle the periphery of the carrier, and are adjustably held in place by set-screws, the shanks of which extend through screw-threaded holes in one side portion of each member and bear at their inner ends against the face of the carrier in a well-known manner, as will be readily understood.

I do not desire to limit myself to the exact construction and organization of the independent turret shifting, adjusting, and locking devices, as these may be variously modified within the purview of this invention.

The further operation of the turret shifting, adjusting, and locking devices will be readily apparent by reference to the accompanying drawings by any one skilled in the art to which this invention appertains and need not therefore be herein more particularly described.

I claim—

1. The combination of a turret; turret-rotating means; and independently-operative spindle-positioning means, including a turret shifting and locking bolt, and two coöperative positioning members adjustable one relatively to the other.

2. The combination of a turret; means for imparting step-by-step rotative movements to said turret; and automatic spindle-positioning means operative alternately with the turret-rotating means for shifting the turret rotatively to position the spindles accurately, and including a turret shifting and locking bolt and two coöperative stop members, one of which members is adjustable for determining the extent of shifting movement imparted to said turret by said bolt.

3. The combination with a turret; of two independent and automatically and alternately effective mechanisms for imparting rotative movements of relatively different ranges, respectively, to said turret, and one of which mechanisms embodies a turret shifting and locking bolt and two coöperative stop members one of which is carried on the turret, and the other of which is shiftable into the path of the former, substantially as described.

4. The combination with a turret, having a series of spindles, of turret-rotating means; and independent spindle-positioning means automatically operative alternately with the turret-rotating means for adjusting the turret circumferentially to position the spindles relatively to a fixed point on the machine, and including a turret shifting and locking bolt, a series of stop-abutments adjustably mounted on the turret, one in operative relation with each spindle, and a stop shiftable into the path of said stop-abutments.

5. The combination with a turret, of a series of spindles mounted in said turret; means for rotating said spindles; means for imparting step-by-step rotative movements to said turret to advance the spindles orbitally to successive approximate working positions; and spindle-positioning means automatically operative alternately with the turret-rotating means and including a spring-actuated bolt for shifting the turret in a direction opposite the direction of its normal rotative movement, a series of stop-abutments mounted on the turret one in operative relation with each spindle, and a reactionary stop intermittently shiftable into the path of the successive stop-abutments.

6. A turret; means for turning the turret with a step-by-step movement; one or more stop-abutments mounted for adjustment upon said turret; a stop projectable into the path of each stop-abutment for determining the position of the turret; and means for locking said turret.

7. A metal-working machine comprehending a turret; automatic means for imparting step-by-step rotative movements of, predetermined arc distances to said turret; two coöperative turret-positioning members one of which is mounted upon the turret and the other of which is shiftable into the path thereof, and one of which is adjustable in the direction of rotation of the turret; and a locking device for said turret.

8. A metal-working machine comprehending a turret; means whereby step-by-step rotative movements may be imparted to the turret; a stop-abutment adjustably mounted on said turret; a stop projectable into the path of the stop-abutment; and a turret-shifting device effective intermediate to each step-by-step movement of the turret for shifting the same circumferentially to bring the stop-abutment into engagement with the stop.

9. The combination with a turret having a series of locking-faces, and with automatically and intermittently operative turret-rotating means for imparting step-by-step rotative movements to said turret; of one or more stop-abutments adjustably mounted on the turret; a stop coöperative with the stop-abutment; means for advancing the stop into the path of the abutment; means operative on the rotative movement of the turret for retracting said stop; a turret adjusting and locking bolt coöperative with the locking-faces of the turret; bolt retracting and advancing means so organized, timed and operating as to retain the bolt out of engagement with the turret until the stop completes its advancing movement; and means for advancing bolt immediately following the advancing movement of said stop, whereby the turret will be adjusted circumferentially to bring the stop-abutment and stop into engagement, and then lock the same in such position.

10. A metal-working machine embodying a turret having one or more circumferentially-disposed adjustable stop-abutments; a reactionary bolt supported in a fixed part of the machine and automatically projectable into the path of, and coöperating with, the stop-abutment for controlling the position of said turret; a reactionary shifting and locking bolt; and means for controlling the advancing movement of the bolt.

11. A multispindle turret supported for rotative movement and having a spur-gear; a turret-rotating mechanism including a driving-shaft and a segment carried thereby and intermittently meshing with the gear of, and imparting step-by-step rotative movements to said turret; stop-abutments adjustably mounted on the turret; a stop mounted in a fixture on the machine and automatically shiftable into the path of the stop-abutments, successively; a turret shifting and locking bolt, shiftable into and out of lock-notches in the turret; and means controlled by the driving-shaft for advancing and retracting said bolt.

12. A turret supported for rotative movements and having one series of lock-bolt-receiving openings and one series of stop-receiving openings disposed circumferentially at different points respectively in the length of said turret; means for imparting intermittent rotative movements to said turret; stop-abutments adjustably secured one in stop-receiving opening; a spring-actuated stop automatically and successively entering the stop-receiving openings and coöperating with the abutments for determining the position of the turret; a spring-actuated bolt successively entering the bolt-receiving openings and effective for shifting the turret, rotatively, to bring the stop and stop-abutment into tight engagement, and for locking the turret in adjusted position; and means actuated by the turret-rotating means for controlling the movements of the bolt.

13. The combination with a turret and its intermittent rotating mechanism, of a plurality of remote circumferentially-disposed stop-abutments each adjustable in the direction of rotation of the turret to vary the distance between the contact-faces of adjacent abutments; a stop shiftable into the path of the stop-abutments; and turret shifting and locking device operative independent of the turret-rotating mechanism, for successively shifting the abutments into engagement with the stop, to fix the position of the turret.

14. A metal-working machine embodying a reciprocatory tool-carrier having one or more tools; reciprocating means for the tool-carrier; a rotative turret having one or more work-spindles; automatic turret-rotating means for imparting step-by-step rotative movements, of predetermined arc distances, to said turret to bring the spindle or spindles into approximate operative relation with the tool or tools of the tool-carrier; and spindle-positioning means, including a turret shifting and locking bolt and coöperative stop members, substantially as described, automatically operative independent of the turret-rotating means for automatically interrupting the movements of the turret whereby to successively center the spindles with respect to a tool or fixed point on the machine.

15. A turret having one or more wedge-faced bolt-receiving openings, and one or more circumferentially-disposed stop-abutments adjustable in the direction of rotative movement of the turret; a stop automatically shiftable into the path of the abutment; and a lock-bolt having a wedge-like face coöperating with the wedge face of the turret to advance the turret rotatively to bring the stop and abutment into tight engagement and lock the turret against rotative movement.

16. The combination with a turret and locking means therefor, including a lock-bolt; of a lock-bolt-actuating lever; a shaft; a disk or plate fixed to said shaft in the plane of the free end of the lever; and two lever-controlling members carried on the disk or plate in position to engage and operate the lever intermittently, and adjustable toward and away from each other to retain the lever in a bolt-retracting position a longer or shorter period of time.

17. The combination with a turret having a series of peripheral lock-notches, and with intermittent rotating mechanism therefor, of a lock-bolt for entering said notches successively; a lock-bolt-advancing spring; and lock-bolt-retracting means embodying actuating members adjustable for holding the bolt in a retracted position a greater or lesser period of time, arbitrarily.

Signed by me at Hartford, Connecticut, this 8th day of December, A. D. 1898.

EDWIN C. HENN.

Witnesses:
PERCY ROTHWELL,
EMORY C. WHITNEY.